United States Patent
Gouko et al.

(10) Patent No.: US 10,845,256 B2
(45) Date of Patent: Nov. 24, 2020

(54) DIAGNOSIS APPARATUS OF ASSEMBLY STATE

(71) Applicant: DENSO CORPORATION, Kariya (JP)

(72) Inventors: Norio Gouko, Kariya (JP); Atusi Sakaida, Kariya (JP); Toshihisa Taniguchi, Kariya (JP); Keiji Okamoto, Kariya (JP); Yoshihiko Shiraishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 15/775,729

(22) PCT Filed: Nov. 9, 2016

(86) PCT No.: PCT/JP2016/083239
§ 371 (c)(1),
(2) Date: May 11, 2018

(87) PCT Pub. No.: WO2017/082298
PCT Pub. Date: May 18, 2017

(65) Prior Publication Data
US 2018/0328796 A1    Nov. 15, 2018

(30) Foreign Application Priority Data
Nov. 12, 2015   (JP) .................................. 2015-222444

(51) Int. Cl.
*G01K 17/00*         (2006.01)
*G01K 17/20*         (2006.01)
(Continued)

(52) U.S. Cl.
CPC .............. *G01K 17/20* (2013.01); *G01K 1/16* (2013.01); *G01K 13/08* (2013.01); *G01M 13/00* (2013.01); *G01M 13/04* (2013.01); *F15B 19/005* (2013.01)

(58) Field of Classification Search
CPC ........ G01N 25/18; G01N 30/66; G01N 25/72; G01N 25/00; G01N 25/20; G01K 17/00;
(Continued)

(56) References Cited

U.S. PATENT DOCUMENTS 4,577,976 A * 3/1986 Hayashi ................. G01N 25/18
374/29
4,779,994 A * 10/1988 Diller ..................... G01K 17/20
136/225

(Continued)

FOREIGN PATENT DOCUMENTS

DE      10 2006 016956 A1    10/2007
EP          3211392 A1         8/2017
(Continued)

OTHER PUBLICATIONS

U.S. Appl. No. 15/775,761.
(Continued)

*Primary Examiner* — Gail Kaplan Verbitsky
(74) *Attorney, Agent, or Firm* — Harness, Dickey & Pierce, P.L.C.

(57) ABSTRACT

A diagnosis apparatus diagnoses an assembly state of an assembled component having a sliding portion. The diagnosis apparatus includes a sensor unit that detects a heat flux flowing from the sliding portion toward an outside, and a control apparatus that determines whether an assembly state of the assembled component is correct or not based on a detection result detected by the sensor unit. A magnitude of a heat flux from the sliding portion is different between when the assembly state of the assembled component having the sliding portion is correct and when it is incorrect. Hence, according to the diagnosis apparatus, it is possible to diagnose whether an assembly state of the assembled component is correct or not.

6 Claims, 8 Drawing Sheets

(51) Int. Cl.
*G01K 1/16* (2006.01)
*G01K 13/08* (2006.01)
*G01M 13/04* (2019.01)
*G01M 13/00* (2019.01)
*F15B 19/00* (2006.01)

(58) Field of Classification Search
CPC ...... G01K 17/06; G01K 13/00; G01K 15/005; G01K 17/04; G01K 7/02; G01K 7/425; G01K 2003/145; G01K 2201/00; G01K 2205/00; G01K 2207/00
USPC ........ 374/29, 30, 137, 141, 44, 45, 57, 4, 1, 374/179
See application file for complete search history.

(56) References Cited

U.S. PATENT DOCUMENTS

| | | | | |
|---|---|---|---|---|
| 5,216,625 A | * | 6/1993 | Rall | G01K 1/16 374/121 |
| 5,464,284 A | * | 11/1995 | Rall | G01J 5/0022 374/121 |
| 6,392,431 B1 | * | 5/2002 | Jones | G01K 1/026 324/750.09 |
| 9,010,404 B2 | * | 4/2015 | Kawase | F22B 37/005 165/11.1 |
| 9,377,370 B2 | * | 6/2016 | Kim | G01K 17/00 |
| 10,408,690 B2 | * | 9/2019 | Gouko | G01K 17/00 |
| 2003/0043885 A1 | * | 3/2003 | Yamazaki | F01N 3/0814 374/163 |
| 2012/0193065 A1 | * | 8/2012 | Kawase | F22B 37/005 165/11.1 |
| 2015/0323395 A1 | * | 11/2015 | Kawakami | F16H 59/72 702/130 |
| 2016/0125671 A1 | | 5/2016 | Tanaka et al. | |
| 2016/0141733 A1 | * | 5/2016 | Shiraishi | H01M 10/0525 320/136 |
| 2017/0211990 A1 | * | 7/2017 | Gouko | G01K 17/00 |
| 2018/0274994 A1 | * | 9/2018 | Gouko | G01M 13/02 |
| 2019/0162684 A1 | * | 5/2019 | Harada | G01L 1/005 |

FOREIGN PATENT DOCUMENTS

| | | |
|---|---|---|
| JP | H03-213249 A | 9/1991 |
| JP | H04-78933 B2 | 12/1992 |
| JP | H05-301144 A | 11/1993 |
| JP | 5376086 B1 | 12/2013 |
| JP | 2017-090319 A | 5/2017 |
| JP | 2017-090320 A | 5/2017 |
| JP | 02018146562 A * | 9/2018 |
| WO | WO-2014/196290 A1 | 12/2014 |
| WO | WO-2014/196294 A1 | 12/2014 |

OTHER PUBLICATIONS

U.S. Appl. No. 15/775,744.
International Search Report dated Feb. 7, 2017 in corresponding application No. PCT/JP2016/083239.

* cited by examiner

US 10,845,256 B2

DIAGNOSIS APPARATUS OF ASSEMBLY STATE

CROSS REFERENCE TO RELATED APPLICATIONS

This application is a U.S. National Phase Application under 35 U.S.C. 371 of International Application No. PCT/JP2016/083239 filed on Nov. 9, 2016 and published in Japanese as WO 2017/082298 A1 on May 18, 2017. This application is based on and claims the benefit of priority from Japanese Patent Application No. 2015-222444 filed on Nov. 12, 2013. The entire disclosures of all of the above applications are incorporated herein by reference.

FIELD

The present disclosure relates to a diagnosis apparatus of an assembly state for diagnosing an assembly state of an assembled component having a sliding portion.

BACKGROUND

An example of a heat flux sensor for detecting a heat flux includes, for example, the one disclosed in Patent Literature 1.

PATENT LITERATURE

PTL 1 JP 5376086 B

SUMMARY

In new installation, repair, maintenance, and the like of equipment, such as production facility, assembly work of assembled components constituting the equipment is performed. This assembly work requires judgment on whether an assembly state of the assembled components is correct or not, after the assembly.

However, it is difficult for a person to judge whether the assembly state is correct or not. Hence, it is desired to realize a diagnosis apparatus capable of diagnosing whether an assembly state of assembled components is correct or not.

The present disclosure has been made in view of the above problems and has an object to provide a diagnosis apparatus of an assembly state that can diagnose whether an assembly state of assembled components is correct or not.

A first aspect according to a diagnosis apparatus of an assembly state is a diagnosis apparatus of an assembly state that diagnoses an assembly state of an assembled component having a sliding portion and includes a sensor unit that detects a heat flux flowing from the sliding portion toward an outside, and a determination unit that determines whether an assembly state of the assembled component is correct or not based on a detection result detected by the sensor unit.

A magnitude of a heat flux from the sliding portion is different between when the assembly state of the assembled component having the sliding portion is correct and when it is not correct. Hence, according to the diagnosis apparatus of the present disclosure, it is possible to diagnose whether an assembly state of the assembled component is correct or not.

DRAWINGS

In appended drawings.

DESCRIPTION

Figure 1:
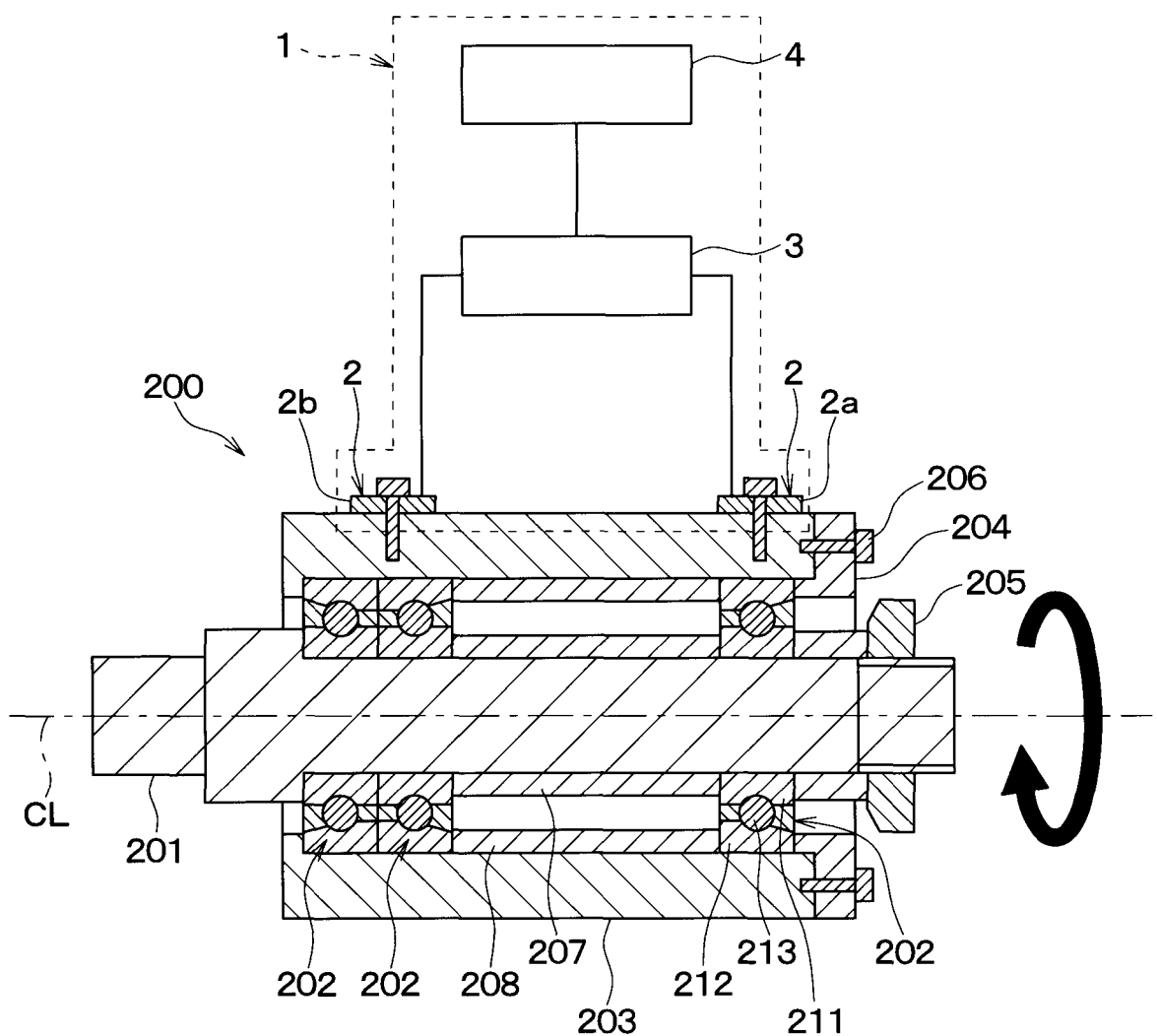
FIG. 1 is a diagram showing a configuration of a support mechanism of a rotating shaft and a diagnosis apparatus 1 of an assembly state in a first embodiment.

Embodiments of the present disclosure will be described below with reference to drawings. Note that, among respective embodiments described below, parts identical or equivalent to each other will be explained with the same reference numeral attached thereto.

First Embodiment

As shown in FIG. 1, a diagnosis apparatus 1 of an assembly state in the present embodiment diagnoses an assembly state of a support mechanism 200 of a rotating shaft.

The support mechanism 200 is provided in production facility or the like. The support mechanism 200 includes a rotating shaft 201, a plurality of bearings 202, a housing 203, and a cover 204.

The rotating shaft 201 rotates around a shaft center CL. An adjusting nut 205 is attached to the rotating shaft 201. The adjusting nut 205 is a member for adjusting a preload.

The bearing 202 is a component for supporting the rotating shaft 201. The bearing 202 is an assembled component having a sliding portion. The plurality of bearings 202 are arranged on a first direction side and a second direction side of a shaft direction CL of the rotating shaft 201, respectively. In the present embodiment, one bearing 202 is arranged on the first direction side of the shaft direction CL. Two bearings 202 are arranged on the second direction side of the shaft direction CL.

The bearing 202 includes an inner race 211, an outer race 212, and balls 213 as rolling elements. The inner race 211 is fixed to the rotating shaft 201. The outer race 212 is fixed to the housing 203. The inner race 211 rotates together with the rotating shaft 201. At this time, the inner race 211, the outer race 212, and the balls 213 slide against each other while rubbing. That is, of the inner race 211 and the outer race 212, a part sliding while rubbing with the balls 213 serves as the sliding portion.

The housing 203 is a supporting member that supports the plurality of bearings 202. The plurality of bearings 202 are housed inside the housing 203. The cover 204 covers an opening of the housing 203. The cover 204 is fixed to the housing 203 by fixing nuts 206.

The support mechanism 200 further includes an inner-race side spacer 207 and an outer-race side spacer 208. The inner-race side spacer 207 is sandwiched between the inner race 211 positioned on the first direction side and the inner race 211 positioned on the second direction side of the shaft direction CL. The outer-race side spacer 208 is sandwiched between the outer race 212 positioned on the first direction side and the outer race 212 positioned on the second direction side of the shaft direction CL.

In the assembly of the support mechanism 200, respective components of the support mechanism 200, such as the above-described rotating shaft 201, the bearings 202, and the housing 203 are assembled as shown in FIG. 1, and then preload adjustment is performed. Preload is a load preliminarily applied to the bearing 202 to eliminate an internal clearance of the bearing 202. Preload adjustment is performed, for example, by strongly tightening the adjusting nut 205 so as to press the inner races 211 positioned on the first direction side and on the second direction side of the shaft direction CL against each other. The inner race 211 and the outer race 212 are shifted in a direction of the shaft center CL, and thereby the balls 213 are pressed between the inner race 211 and the outer race 212.

The diagnosis apparatus 1 includes a sensor unit 2, a control apparatus 3, and a display 4.

The sensor unit 2 detects a heat flux flowing from the bearing 202 toward an outside. The sensor unit 2 outputs, toward the control apparatus 3, a sensor signal corresponding to the heat flux flowing from the bearing 202 toward the outside. The sensor unit 2 is attached to a surface of the housing 203. Details of a structure of the sensor unit 2 will be described later.

In the present embodiment, two sensor units 2a, 2b are used as the sensor unit 2. The first sensor unit 2a is arranged corresponding to the bearing 202 on the first direction side of the shaft center CL direction. The second sensor unit 2b is arranged corresponding to the bearing 202 on the second direction side of the shaft center CL direction.

The sensor unit 2 is connected to an input side of the control apparatus 3. The control apparatus 3 performs diagnostic control of an assembly state of the bearing 202. The assembly state of the bearing 202 mentioned here is a preload condition of the bearing 202. The diagnostic control is a control of determining whether the assembly state of the bearing 202 is correct or not based on a detection result of the sensor unit 2. Thus, the control apparatus 3 constitutes a determination unit that determines whether the assembly state of the bearing 202 is correct or not based on a detection result of a heat flux sensor 10.

The display 4 is connected to an output side of the control apparatus 3. The control apparatus 3 causes the display 4 to display the determination result. The control apparatus 3 includes a microcomputer, a memory, and the like.

The display 4 is a notification device for notifying the determination result to a user. A liquid crystal display or the like is used as the display 4.

Figure 2:
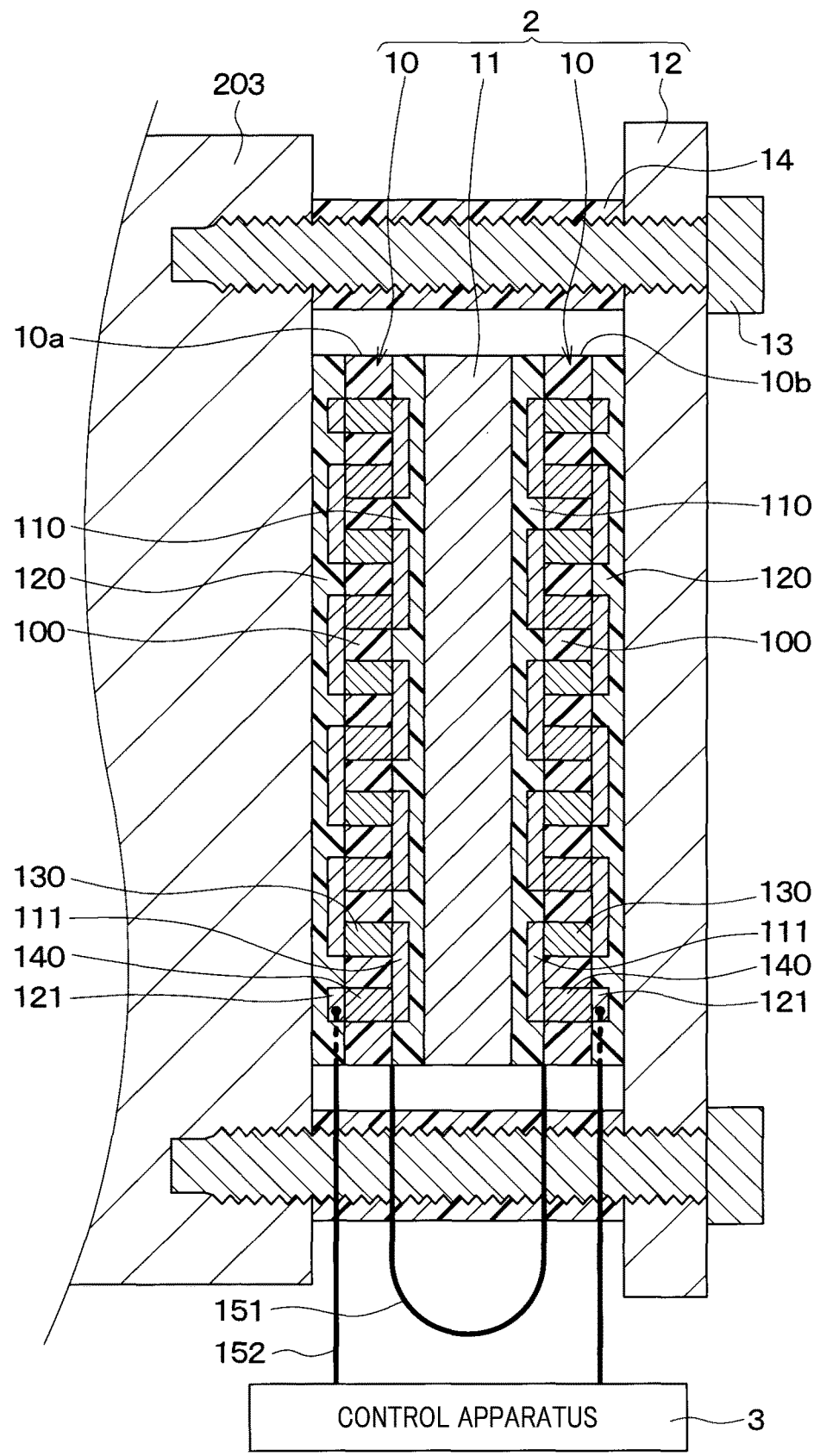
FIG. 2 is a cross-sectional view of a sensor unit shown in FIG. 1.

Next, the structure of the sensor unit 2 will be described. As shown in FIG. 2, the sensor unit 2 includes two heat flux sensors 10, a thermal buffer 11, and a heat sink 12. Each of the two heat flux sensors 10, the thermal buffer 11, and the heat sink 12 has a flat plate shape.

The two heat flux sensors 10 have the same internal structure. One of the two heat flux sensors 10 is a first heat flux sensor 10a. Another one of the two heat flux sensors 10 is a second heat flux sensor 10b.

The first heat flux sensor 10a is arranged in contact with an outer surface of the housing 203. The second heat flux sensor 10b is arranged on a side apart from the housing 203, that is, a side apart from the bearing 202 with respect to the first heat flux sensor 10a. The thermal buffer 11 is arranged between the first heat flux sensor 10a and the second heat flux sensor 10b. The heat sink 12 is arranged on a side apart from the bearing 202 with respect to the second heat flux sensor 10b. That is, in the sensor unit 2, the first heat flux sensor 10a, the thermal buffer 11, the second heat flux sensor 10b, and the heat sink 12 are sequentially arranged from the side close to the bearing 202 toward the side apart from the bearing 202.

The first heat flux sensor 10a outputs a first sensor signal corresponding to a heat flux passing through the first heat flux sensor 10a from the bearing 202 side toward the thermal buffer 11 side of the first heat flux sensor 10a. The second heat flux sensor 10b outputs a second sensor signal corresponding to a heat flux passing through the second heat flux sensor 10b from the thermal buffer 11 side toward the opposite side thereof of the second heat flux sensor 10b. Each of the planar shapes of the first heat flux sensor 10a and the second heat flux sensor 10b is a rectangle having the same form and size.

The thermal buffer 11 has a predetermined heat capacity. The thermal buffer 11 is composed of a metal material or a resin material. The material and thickness of the thermal buffer 11 are, as described below, set so that the thermal buffer 11 has a heat capacity capable of detecting a variation of the heat flux emitted from the bearing 202 toward the outside. The planar shape of the thermal buffer 11 is the same as that of the first heat flux sensor 10a in form and size. Note that, the planar shape of the thermal buffer 11 may be different from that of the first heat flux sensor 10a in form and size.

The heat sink 12 has a predetermined heat capacity. The heat sink 12 is composed of a metal material or a resin material. The material and thickness of the heat sink 12 are set so that the heat sink 12 has a heat capacity larger than that of the thermal buffer 11. The planar shape of the heat sink 12 is larger than that of the first heat flux sensor 10a, the thermal buffer 11, or the second heat flux sensor 10b. The heat sink 12 is fixed to the housing 203 with the first heat flux sensor 10a, the thermal buffer 11, and the second heat flux sensor 10b sandwiched between the heat sink 12 and the housing 203. Specifically, screw holes are formed in an outer periphery of the heat sink 12. The heat sink 12 is fixed to the housing 203 by screws 13 inserted into the screw holes. Note that spacers 14 are arranged between the housing 203 and the heat sink 12. The screw 13 penetrates the inside of the spacer 14.

Figure 3:
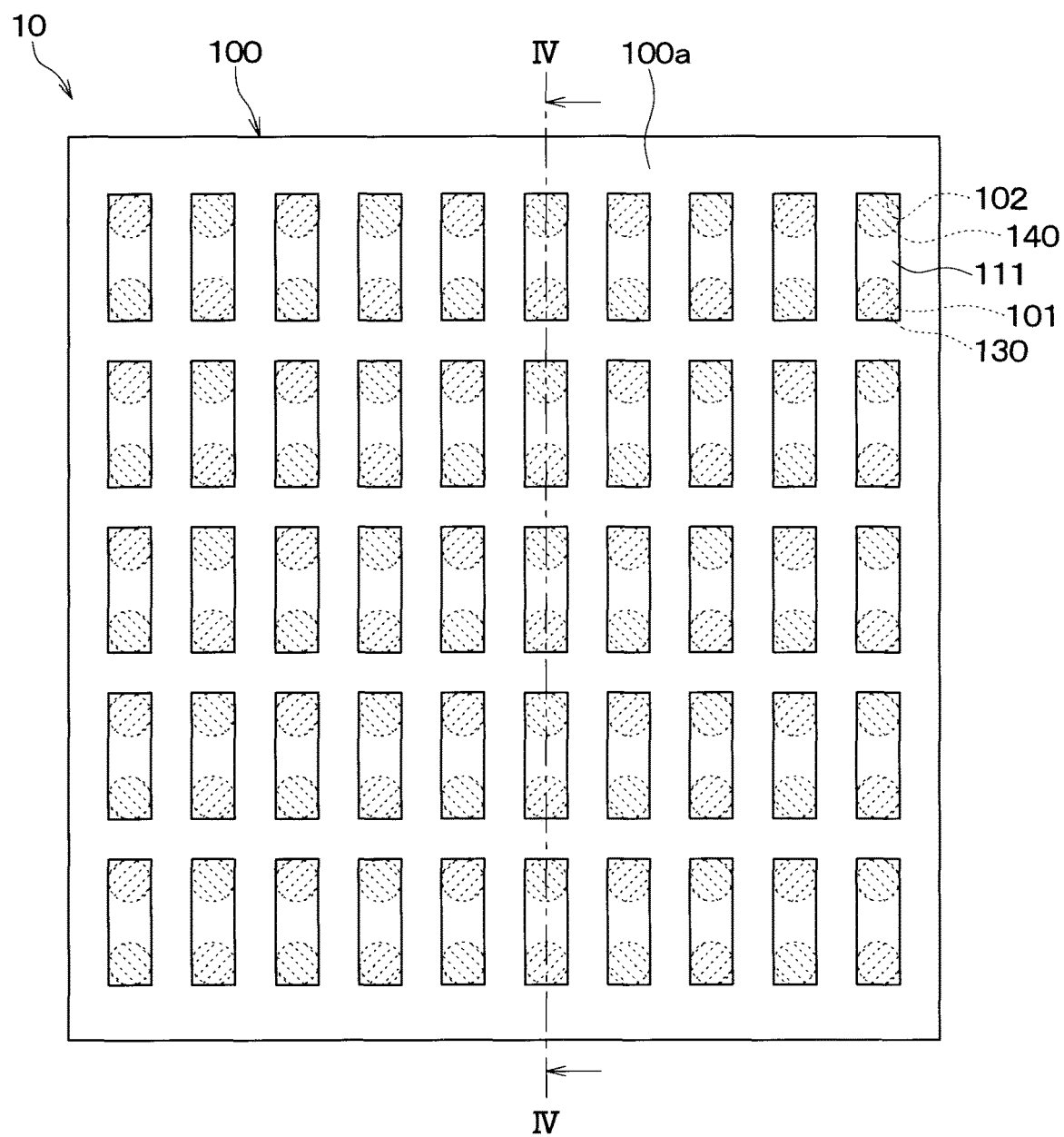
FIG. 3 is a plan view of a heat flux sensor shown in FIG. 2.
Figure 4:
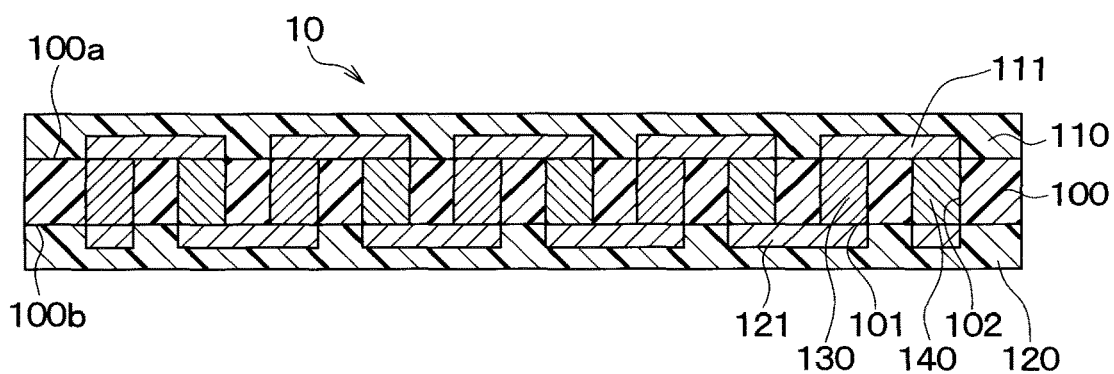
FIG. 4 is a cross-sectional view of the heat flux sensor taken along a line IV-IV shown in FIG. 3.

As shown in FIGS. 3 and 4, one heat flux sensor 10 has a structure in which an insulating substrate 100, a front surface protecting member 110, and a rear surface protecting member 120 are integrated, and first and second thermoelectric members 130, 140 are alternately connected in series inside the integrated one. Note that, in FIG. 3, the front surface protecting member 110 is omitted. Each of the insulating substrate 100, the front surface protecting member 110, and the rear surface protecting member 120 is in a film state, and is composed of a flexible resin material, such as a thermoplastic resin. The insulating substrate 100 has a plurality of first and second via holes 101, 102 formed therein that penetrate the insulating substrate 100 in its thickness direction. The first and second via holes 101, 102 have the first and second thermoelectric members 130, 140 embedded therein that are composed of thermoelectric materials, such as metal or semiconductor, different from each other, respectively. A front surface conductor pattern 111 arranged on a front surface 100a of the insulating substrate 100 constitutes a first connection part of the first and second thermoelectric members 130, 140. A rear surface conductor pattern 121 arranged on a rear surface 100b of the insulating substrate 100 constitutes a second connection part of the first and second thermoelectric members 130, 140.

When the heat flux passes through the heat flux sensor 10 in the thickness direction of the heat flux sensor 10, a temperature difference is generated between the first connection part and the second connection part of the first and second thermoelectric members 130, 140. This generates a thermal electromotive force in the first and second thermoelectric members 130, 140 due to the Seebeck effect. The heat flux sensor 10 outputs the thermal electromotive force, specifically, a voltage as a sensor signal.

In the present embodiment, the first heat flux sensor 10a and the second heat flux sensor 10b are configured to output the sensor signals having the same magnitude of absolute values when the heat fluxes passing through the respective sensors have the same magnitude.

In addition, as shown in FIG. 2, the first heat flux sensor 10a and the second heat flux sensor 10b are electrically connected to the control apparatus 3 in a state of being connected with each other in series. The first heat flux sensor 10a and the second heat flux sensor 10b are, when the heat flux from the bearing 202 sequentially passes through the first heat flux sensor 10a and the second heat flux sensor 10b, arranged to output the first sensor signal and the second sensor signal having a relation of opposite polarities.

Specifically, the first and second heat flux sensors 10a and 10b are arranged so that the respective front surface protecting members 110 face each other. In addition, although not shown in the drawing, the front surface conductor patterns 111 of the first and second heat flux sensors 10a and 10b are connected via an external wiring 151. Each of the rear surface conductor patterns 121 of the first and second heat flux sensors 10a and 10b is connected to the control apparatus 3 via an external wiring 152. With this arrangement, when a heat flux passes through the first heat flux sensor 10a from the rear surface protecting member 120 side to the front surface protecting member 110 side, the heat flux passes through the second heat flux sensor 10b from the front surface protecting member 110 side to the rear surface protecting member 120 side. Hence, polarities of the first and second sensor signals respectively output from the first and second heat flux sensors 10a and 10b are opposite to each other.

Note that, in the present embodiment, the first and second heat flux sensors 10a and 10b output positive sensor signals when the heat flux has passed from the rear surface protecting member 120 side toward the front surface protecting member 110 side. Hence, when the heat flux flows from the bearing 202 side toward the heat sink 12 side, a positive sensor signal is outputted from the first heat flux sensor 10a and a negative sensor signal is outputted from the second heat flux sensor 10b.

Then, the sensor unit 2 outputs a sensor signal obtained by adding the first sensor signal and the second sensor signal toward the control apparatus 3. At this time, if the difference between the heat fluxes passing through the first and second heat flux sensors 10a and 10b is large, the sensor signal outputted from the sensor unit 2 becomes large. Such a case corresponds to, for example, a case where a heat flux emitted from a target object has rapidly increased. On the other hand, if the difference between the heat fluxes passing through the first and second heat flux sensors 10a and 10b is small, the output outputted from the sensor unit 2 becomes small. Such a case corresponds to, for example, a case where a heat flux emitted from a target object has decreased or a case where a heat flux emitted from a target object is constant and a predetermined time has elapsed.

Next, a diagnostic control of an assembly state of the bearing 202 performed by the control apparatus 3 will be described.

First, a heat flux passing through the sensor unit 2 and a sensor signal outputted from the sensor unit 2 will be described.

Figure 5:
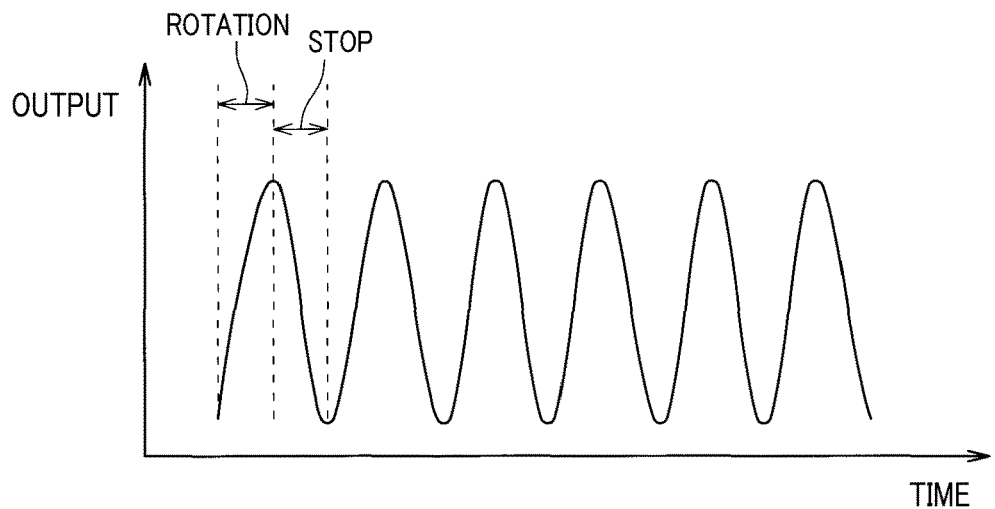
FIG. 5 is a graph showing an output waveform of the sensor unit when a preload condition of a bearing is correct.

In the support mechanism 200, when the rotating shaft 201 rotates, the sliding portion of the bearing 202 generates heat. When the rotating shaft 201 stops rotation, the sliding portion of the bearing 202 does not generate heat. Therefore, when the rotating shaft 201 repeats rotation and stop, the heat flux from the sliding portion of the bearing 202 toward the outside repeatedly increases and decreases. Hence, when the bearing 202 is in a state of correct preload, a waveform indicating a change of an output value of the sensor unit 2 with lapse of time is, as shown in FIG. 5, a waveform that regularly increases and decreases along a cycle of rotation and stop of the rotating shaft 201.

The reason is as follows. As described above, when the rotating shaft 201 repeats rotation and stop, the heat flux from the sliding portion of the bearing 202 toward the outside repeats increase and decrease. At this time, as shown in FIG. 2, the first heat flux sensor 10a has nothing to block the heat flux from the housing 203. Hence, the heat flux passing through the first heat flux sensor 10a increases and decreases like the heat flux flowing through the housing 203. On the other hand, as shown in FIG. 2, the second heat flux sensor 10b has the thermal buffer 11 arranged on the first heat flux sensor 10a side. The thermal buffer 11 performs heat storage and heat radiation. Hence, the heat flux does not pass through the second heat flux sensor 10b. Alternatively, the heat flux passing through the second heat flux sensor 10b slowly increases and decreases later than the heat flux passing through the first heat flux sensor 10a. The sensor signal outputted from the sensor unit 2 toward the control apparatus 3 is a signal obtained by adding the first sensor signal and the second sensor signal. Hence, the output value of the sensor unit 2 regularly increases and decreases along a cycle of rotation and stop of the rotating shaft 201.

Figure 6:
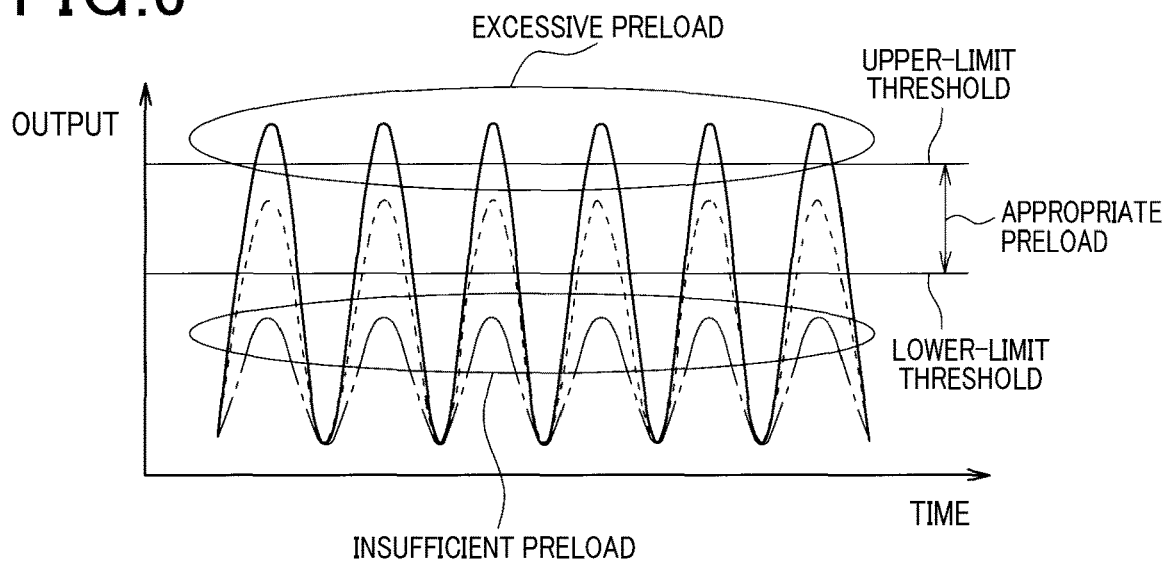
FIG. 6 is a graph showing an output waveform of the sensor unit when a preload condition of the bearing is excessive preload or insufficient preload.

When the bearing 202 is in a state of excessive preload, friction in the sliding portion of the bearing 202 is large. Hence, when the rotating shaft 201 rotates, a heat generation amount in the sliding portion of the bearing 202 becomes large. Therefore, when the bearing 202 is in a state of excessive preload, as shown with a solid line in FIG. 6, compared with the output value of the sensor unit 2 at the time of correct preload shown with a wavy line, the output of the sensor unit 2 at the time of rotation is larger.

Further, when the bearing 202 is in a state of insufficient preload, friction in the sliding portion of the bearing 202 is small. Hence, when the rotating shaft 201 rotates, a heat generation amount in the sliding portion of the bearing 202 becomes small. Therefore, when the bearing 202 is in the state of insufficient preload, as shown with a chain line in FIG. 6, compared with the output value of the sensor unit 2 at the time of correct preload shown with the wavy line, the output value of the sensor unit 2 at the time of rotation is small.

As described above, the output value of the sensor unit 2 is different depending on each of when the preload state of the bearing 202 is correctly preload, when it is excessively preloaded, and when it is insufficiently preloaded. Thus, an upper-limit threshold for determining the state of correct preload and the state of excessive preload and a lower-limit threshold for determining the state of correct preload and the state of insufficient preload are preset. Then, the output value of the bearing 202 is compared with the upper-limit threshold and the lower-limit threshold. Hence, it is possible to determine whether the preload state of the bearing 202 is correct or not.

Figure 7:
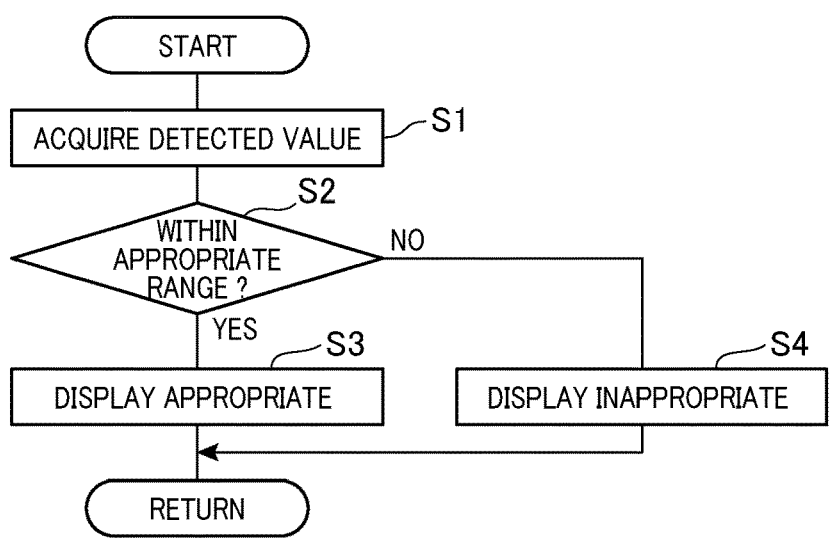
FIG. 7 is a flowchart showing a diagnostic control of an assembly state in the first embodiment.

Then, as shown in FIG. 7, the control apparatus 3 diagnoses an assembly state on the basis of a detection result of the sensor unit 2. Note that each step shown in FIG. 7 constitutes a function realizing part for realizing various functions. In addition, this diagnosis is performed for each detection result of each of the sensor unit 2a and the sensor unit 2b.

Specifically, in step S1, the control apparatus 3 acquires a detection value of the sensor unit 2. Here, it acquires an output value (specifically, voltage value) of the sensor unit 2 at a predetermined time. Note that instead of using the output value of the sensor unit 2 as it is, it may acquire a corrected value obtained by correcting the output value as the detection value.

Subsequently, in step S2, the control apparatus 3 compares the detection value with the upper-limit threshold and the lower-limit value preliminarily stored in a storage device to determine whether the detection value is within an correct range or not. In a case where the detection value is a value between the upper-limit threshold and the lower-limit threshold, that is, in a case where the detection value is within the correct range, the control apparatus 3 makes YES determination and proceeds to step S3. In step S3, the control apparatus 3 outputs a control signal for causing the display 4 to display that the preload state is correct. Hence, the display 4 displays that the preload state is correct.

On the other hand, in step S2, in a case where the detection value has exceeded the upper-limit threshold, or in a case where the detection value is lower than the lower-limit threshold, that is, in a case where the detection value is outside the correct range, the control apparatus 3 makes NO determination and proceeds to step S4. In step S4, the control apparatus 3 outputs a control signal for causing the display 4 to display that the preload state is incorrect. Hence, the display 4 displays that the preload state is incorrect. Note that in a case where the detection value is outside the correct range, the display 4 may be caused to display that the preload state is the state of excessive preload or the state of insufficient preload.

As described above, according to the diagnosis apparatus 1 of the present embodiment, it is possible to diagnose whether the preload state of the bearing 202 is correct or not.

In addition, in the diagnosis apparatus 1 of the present embodiment, the sensor unit 2 has the thermal buffer 11 arranged between the first heat flux sensor 10a and the second heat flux sensor 10b. The control apparatus 3 determines whether the preload state of the bearing 202 is correct or not based on the first sensor signal outputted from the first heat flux sensor 10a and the second sensor signal outputted from the second heat flux sensor 10b.

The thermal buffer 11 stores and radiates heat. Hence, when the heat flux emitted from the sliding portion of the bearing 202 has varied, the heat flux passing through the second heat flux sensor 10b slowly varies later than the heat flux passing through the first heat flux sensor 10a. Therefore, the variation of the heat flux emitted from the sliding portion of the bearing 202 can be detected due to the difference between the first sensor signal and the second sensor signal.

Incidentally, the heat flux emitted from the sliding portion of the bearing 202 can be detected by using only one heat flux sensor 10, instead of the sensor unit 2 of the present embodiment.

However, in this case, if an ambient temperature around the support mechanism 200 of the rotating shaft varies, the heat flux passing through the heat flux sensor 10 also varies affected by the ambient temperature. That is, even if a heat generation amount at the sliding portion of the bearing 202 is the same, the heat flux passing through the heat flux sensor 10 when the ambient temperature is lower is larger than that when the ambient temperature is higher.

Figure 8:
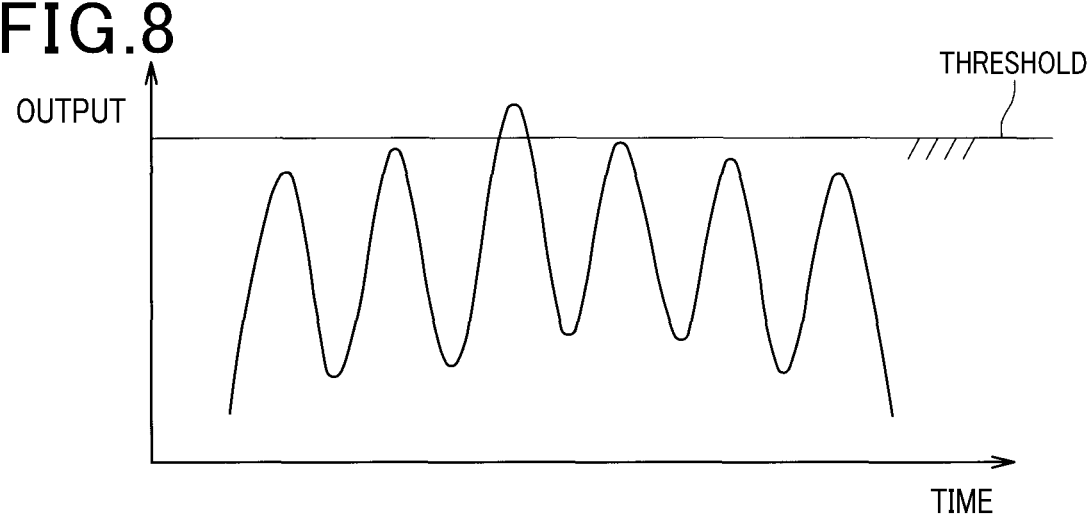
FIG. 8 is a graph showing an output waveform of the heat flux sensor when the preload is correct, and a heat flux is affected by an ambient temperature in a modified example of the first embodiment using one heat flux sensor.

Hence, as shown in FIG. 8, even if the preload state of the bearing 202 is correct, there is a case where the output value of the sensor unit 2 exceeds the threshold due to daily variation of the ambient temperature. In this case, the control apparatus 3 may erroneously determine that the preload state of the bearing 202 is not correct. To avoid the errors, the upper-limit threshold may be set to be high in consideration of the variation of ambient temperature. However, in this case, even if the preload state of the bearing 202 is excessive, the preload state may be erroneously determined to be correct.

In contrast, the first heat flux sensor 10a and the second heat flux sensor 10b of the sensor unit 2 of the present embodiment are arranged on both sides of the thermal buffer 11, respectively. Therefore, both sensors are arranged at positions relatively close to each other. In addition, the variation of the ambient temperature around the sensor unit 2 generally occurs slowly for a long period of time of one day. Hence, even if the thermal buffer 11 is arranged between the first heat flux sensor 10a and the second heat flux sensor 10b, influences exerted on the first heat flux sensor 10a and the second heat flux sensor 10b from the ambient temperature are the same or almost the same. Each of the first heat flux sensor 10a and the second heat flux sensor 10b outputs the sensor signal corresponding to the heat flux having received the same influence of ambient temperature. In the first heat flux sensor 10a and the second heat flux sensor 10b, the absolute value of the output corresponding to the same magnitude of the heat flux is the same. Therefore, it is possible to exclude (that is, cancel) the influence of ambient temperature on the detection result of the sensor unit 2 by using a sum of the outputs of the first heat flux sensor 10a and the second heat flux sensor 10b.

Hence, an output waveform of the sensor unit 2 when the preload state of the bearing 202 is correct is the one from which the influence of ambient temperature has been excluded, like the one at the time of correct preload shown in FIG. 5. Thereby, errors due to daily variation of ambient temperature can be avoided. In addition, there is no need to set the upper-limit threshold to be high in consideration of the variation of ambient temperature.

Therefore, according to the diagnosis apparatus 1 of the present embodiment, diagnosis of assembly state of the bearing 202 can be accurately performed. Note that in the first heat flux sensor 10a and the second heat flux sensor 10b, the absolute values of the outputs for the same magnitude of the heat flux may not be always the same. The absolute values of both outputs have only to be close to each other. In this case, too, it is possible to reduce the influence of ambient temperature on the detection result of the sensor unit 2 by using a sum of the outputs of the first heat flux sensor 10a and the second heat flux sensor 10b.

In addition, in the sensor unit 2 of the present embodiment, the first heat flux sensor 10a and the second heat flux sensor 10b output the first sensor signal and the second sensor signal having a relation of opposite polarities when the heat flux from the sliding portion of the bearing 202 has sequentially passed through the first heat flux sensor 10a and the second heat flux sensor 10b. The first heat flux sensor 10a and the second heat flux sensor 10b are electrically connected to the control apparatus 3 in a state of being connected with each other in series. Thereby, the sensor signal obtained by adding the first sensor signal and the second sensor signal can be outputted from the sensor unit 2 toward the control apparatus 3. Hence, calculation of a sum of the first sensor signal and the second sensor signal in the control apparatus 3 can be omitted. That is, arithmetic processing of the control apparatus 3 can be simplified.

Incidentally, the sensor unit 2 may have a configuration without the heat sink 12. However, in a case where the sensor unit 2 does not have the heat sink 12, the surface temperature of the second heat flux sensor 10b may change instantaneously, for reasons such as wind on the surface of the second heat flux sensor 10b. This affects the heat flux passing through the sensor unit 2. Hence, the detection accuracy of heat flux of the sensor unit 2 decreases.

In contrast, the sensor unit 2 of the present embodiment includes the heat sink 12 having a predetermined heat capacity. This can suppress the temperature variation of the second heat flux sensor 10b from occurring, by heat storage and heat radiation in the heat sink 12, even when the surface temperature of the sensor unit 2 varies in a short period of time. Hence, the detection accuracy of heat flux of the sensor unit 2 can be improved.

In addition, in the sensor unit 2 of the present embodiment, the heat capacity of the heat sink 12 is made larger than that of the thermal buffer 11. Thereby, even when a large amount of heat is radiated from the sliding portion of the bearing 202, the heat can be made to flow from the sliding portion of the bearing 202 toward the heat sink 12. Hence, heat can be suppressed from accumulating inside the sensor unit 2.

Second Embodiment

Figure 9:
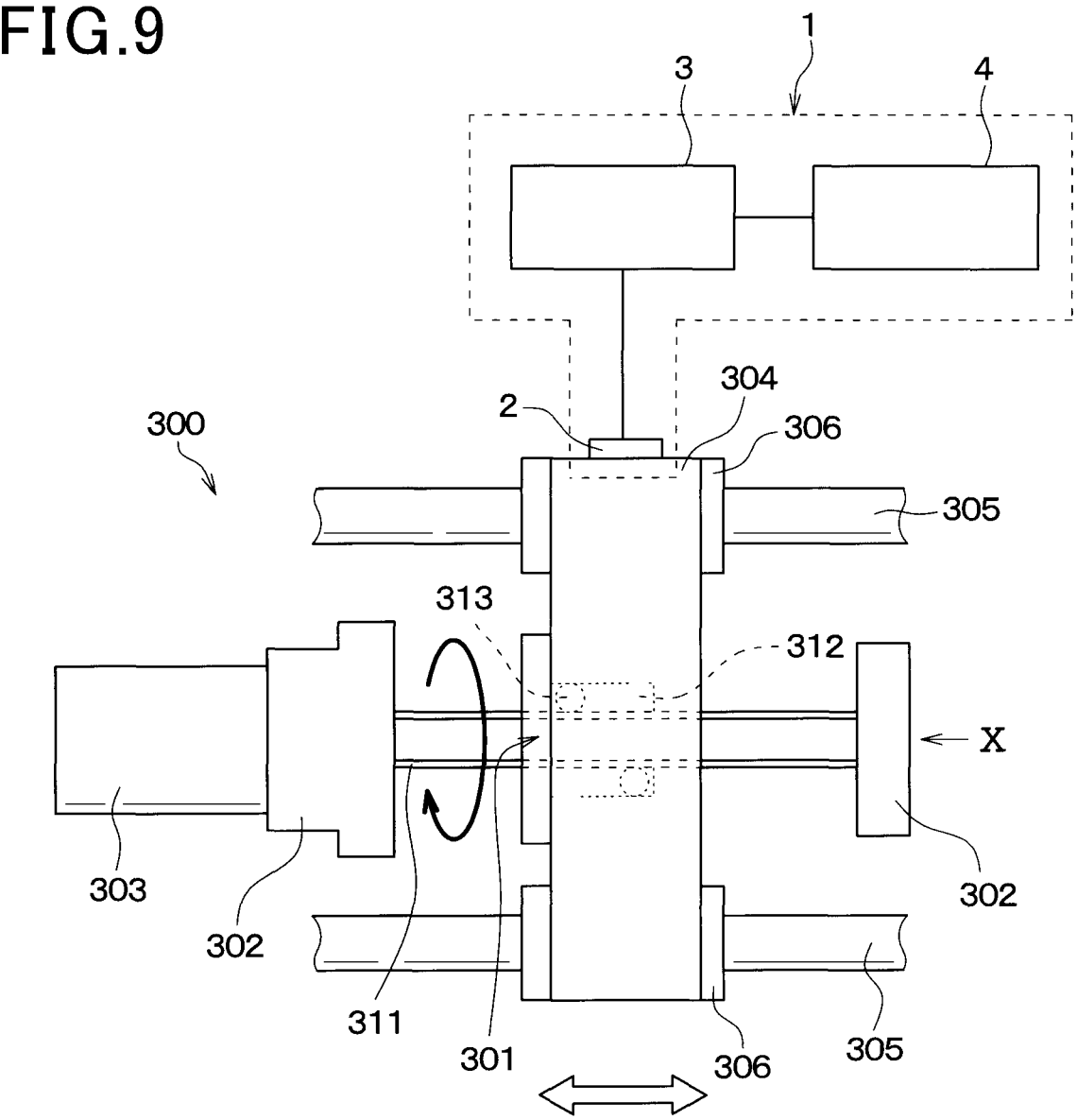
FIG. 9 is a diagram showing a configuration of a transfer device and a diagnosis apparatus of an assembly state in a second embodiment.

As shown in FIG. 9, a diagnosis apparatus 1 of an assembly state in the present embodiment diagnoses an assembly state of a transfer device 300.

Figure 10:
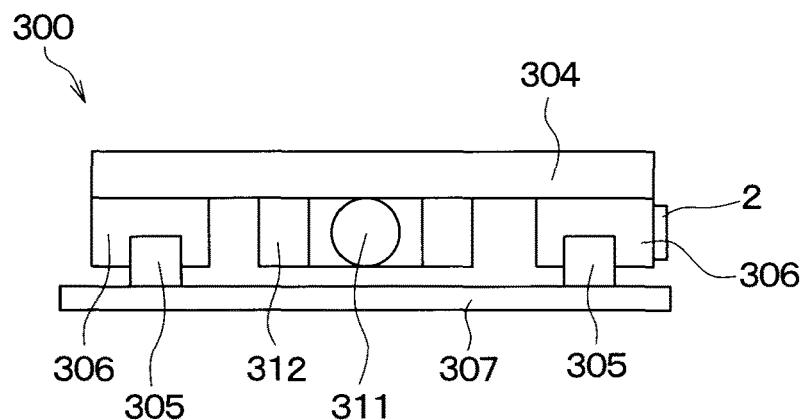
FIG. 10 is a view of the transfer device along an arrow X shown in FIG. 9.

As shown in FIGS. 9 and 10, the transfer device 300 includes a ball screw 301, a support member 302, a motor 303, a seat 304, rails 305, and a guide block 306. Note that, in FIG. 10, to facilitate understanding, the support member 302 is omitted in the drawing.

The ball screw 301 is a mechanical element component that transforms rotational movement into linear movement. The ball screw 301 has a threaded shaft 311, a nut 312, and balls 313. The balls 313 are interposed between the threaded shaft 311 and the nut 312. When the threaded shaft 311 rotates, the nut 312 moves linearly. The support member 302 supports both ends in a shaft direction of the threaded shaft 311. The motor 303 is a power source for rotating the threaded shaft 311.

The seat 304 mounts a device to be transferred or the like. The seat 304 is formed into a flat rectangular shape with a direction orthogonal to the shaft direction of the threaded shaft 311 (that is, vertical direction in FIG. 9) as a longitudinal direction. The nearly central portion of the seat 304 in the longitudinal direction is connected with the nut 312. Both ends of the seat 304 in the longitudinal direction are connected with the guide blocks 306, respectively.

The rail 305 is a linear member. Two pieces of the rail 305 are used. As shown in FIG. 10, the rails 305 are fixed to a base plate 307. The guide block 306 is engaged with the rail 305. The guide block 306 is a guide member that moves along the rail 305. The rail 305 and the guide block 306 rub with each other when the guide block 306 moves on the rail 305. A portion rubbing with the guide block 306 in the rail 305 is a sliding portion. Therefore, in the present embodiment, the two rails 305 constitute an assembled component having the sliding portion.

In such a transfer device 300, the seat 304 runs along the rails 305 together with the nut 312 when the threaded shaft 311 rotates by the motor 303. This makes it possible to transfer the seat 304 to a desired position.

In the assembly of the transfer device 300, respective components of the transfer device 300, such as the above-described rail 305 and guide block 306, are assembled as shown in FIGS. 9 and 10. At this time, the two rails 305 are installed in parallel.

The configuration of the diagnosis apparatus 1 of the present embodiment is the same as that of the diagnosis apparatus 1 of the first embodiment. A sensor unit 2 is attached to a surface of the guide block 306 of the transfer device 300. In the sensor unit 2, although not shown in the drawing, the first heat flux sensor 10a, the thermal buffer 11, the second heat flux sensor 10b, and the heat sink 12 are sequentially arranged from a side closer to the guide block 306 toward a side apart from the guide block 306.

The control apparatus 3 diagnoses whether the assembly state of the two rails 305 is correct or not. The assembly state of the two rails 305 mentioned here is an installation state of the two rails 305. The control apparatus 3 diagnoses whether the installation state of the two rails 305 is correct or not, that is, whether parallelism of the two rails 305 is satisfactory or not.

Next, the diagnostic control of assembly state of the present embodiment will be described.

First, a sensor signal outputted from the sensor unit 2 will be described. The transfer device 300 repeats an operating cycle including run and stop of the seat 304 in one cycle. During run of the seat 304, the output value of the sensor unit 2 increases due to friction between the sliding portion of the rail 305 and the sliding portion of the guide block 306. During stop of the seat 304, the output value of the sensor unit 2 decreases.

Figure 11:
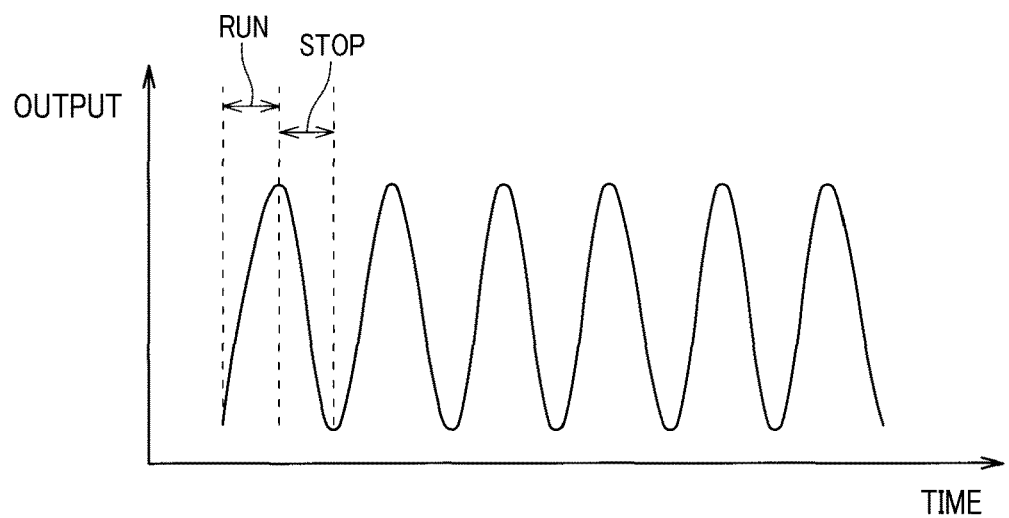
FIG. 11 is a graph showing an output waveform of the sensor unit when an assembly state of two rails is correct.

Hence, the waveform indicating variation of the output value of the sensor unit 2 with lapse of time when the parallelism of the two rails 305 is satisfactory is, as shown in FIG. 11, a waveform that regularly increases and decreases along the operating cycle of the transfer device 300.

Figure 12:
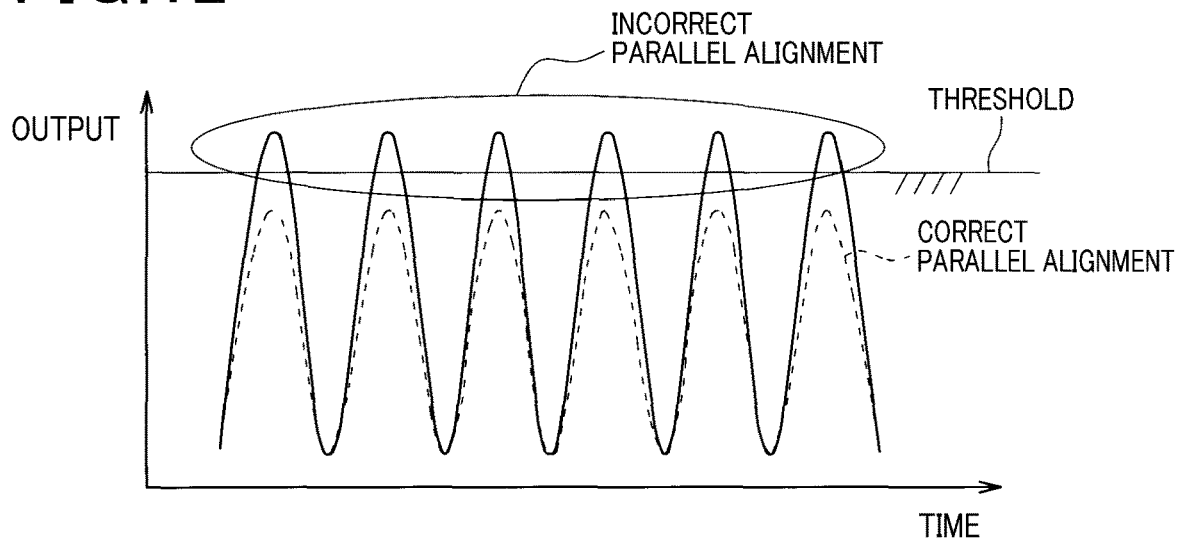
FIG. 12 is a graph showing an output waveform of the sensor unit when an assembly state of two rails is incorrect.

There is a case where a portion in which the two rails 305 are not in parallel is locally generated due to undulating, floating, or the like of at least a part of the two rails 305. In a state where the parallelism of the two rails 305 is unsatisfactory like this, the friction of the sliding portion is large, and the heat flux from the sliding portion becomes large. Hence, the waveform indicating variation of the output value of the sensor unit 2 with lapse of time when the parallelism is unsatisfactory is, as shown in FIG. 12, a waveform having a larger peak value of output than that when the parallelism is satisfactory.

As described above, the output value of the sensor unit 2 is different between when the parallelism of the two rails 305 is satisfactory and when it is unsatisfactory. Hence, a threshold for determining a state of satisfied parallelism and a state of unsatisfied parallelism is set in advance to compare the output value of the sensor unit 2 with the threshold. This makes it possible to determine whether the assembly state of the two rails 305 is correct or not.

Then, in the diagnosis apparatus 1 of the present embodiment, too, like the first embodiment, the control apparatus 3 diagnoses the assembly state on the basis of the detection result of the sensor unit 2. Specifically, the control apparatus 3 compares the detection value of the sensor unit 2 with the threshold. As shown with a wavy line in FIG. 12, in a case where the detection value does not exceed the threshold, the control apparatus 3 determines that the assembly state is correct. On the other hand, as shown with a solid line in FIG. 12, in a case where the detection value exceeds the threshold, the control apparatus 3 determines that the assembly state is not correct. Thus, according to the diagnosis apparatus 1 of the present embodiment, it is possible to diagnose whether the assembly state of the two rails 305 is correct or not.

In addition, the sensor unit 2 used in the diagnosis apparatus 1 of the present embodiment has the same configuration as that of the sensor unit 2 of the first embodiment. Hence, the diagnosis apparatus 1 of the present embodiment also exerts the same effect as that of the diagnosis apparatus 1 of the first embodiment.

Note that, as the sensor unit 2 used in the diagnosis apparatus 1 of the present embodiment, only the first heat flux sensor 10 may be used.

Third Embodiment

The present embodiment modifies the configuration of the sensor unit 2 of the first embodiment. The other configuration of the diagnosis apparatus 1 is the same as that of the first embodiment.

Figure 13:
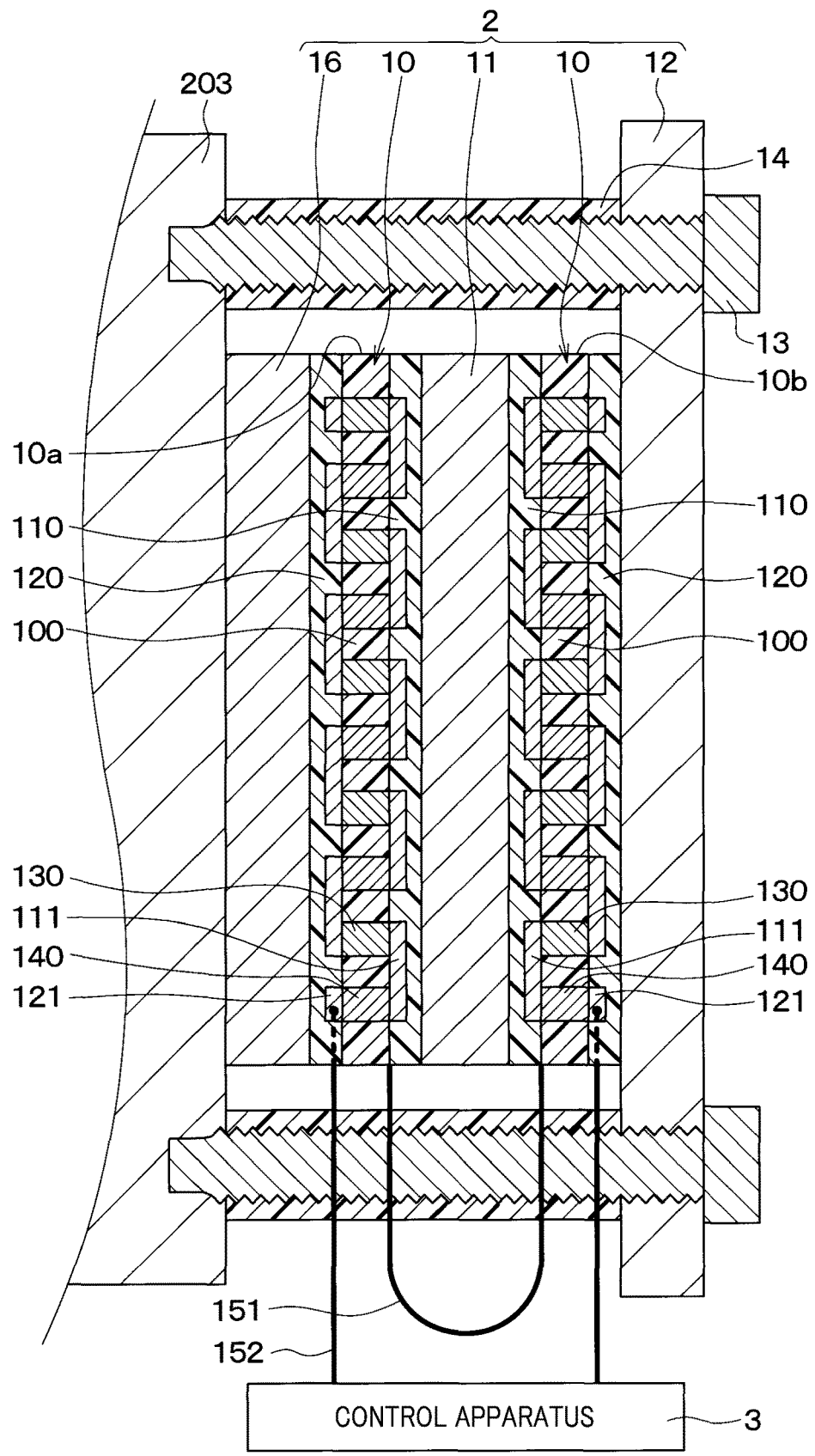
FIG. 13 is a cross-sectional view of a sensor unit in a third embodiment.

As shown in FIG. 13, a sensor unit 2 of the present embodiment has a flat plate-shaped heat receiver 16. The heat receiver 16 is arranged closer to a housing 203 side than a first heat flux sensor 10*a* is, that is, on a bearing 202 side. Therefore, the heat receiver 16 is arranged between the bearing 202 and the first heat flux sensor 10*a*.

The heat receiver 16 has a predetermined heat capacity like a thermal buffer 11 and a heat sink 12. The heat receiver 16 is composed of a metal material or a resin material. The material and thickness of the heat receiver 16 are set so that its heat capacity is smaller than that of each of the thermal buffer 11 and the heat sink 12. A planar shape of the heat receiver 16 is the same as that of the first heat flux sensor 10*a* in form and size. Note that the planar shape of the heat receiver 16 may be different from that of the first heat flux sensor 10*a* in form and size.

In the sensor unit 2 of the present embodiment, it is possible to prevent the variation of the heat flux generated in a short term, such as noise, which is not a detection target, from affecting the first and second heat flux sensors 10*a* and 10*b* by heat storage and heat radiation of the heat receiver 16.

In addition, in the sensor unit 2 of the present embodiment, the heat capacity of the heat receiver 16 is set small. Hence, the sensor unit 2 of the present embodiment can detect a variation of the heat flux due to rotation and stop of the rotating shaft 201, which is a detection target. That is, in the sensor unit 2 of the present embodiment, the heat capacity of the heat receiver 16 is set to a magnitude capable of detecting a variation of the heat flux due to rotation and stop of the rotating shaft 201.

Thus, the diagnosis apparatus 1 of the present embodiment can accurately diagnose whether a preload state of the bearing 202 is correct or not. Note that, the second embodiment, too, may have a configuration in which the sensor unit 2 has the heat receiver 16. With the configuration, the second embodiment exerts the same effect as that of the present embodiment.

Fourth Embodiment

The present embodiment modifies the configuration of the sensor unit 2 of the first embodiment. The other configuration of the diagnosis apparatus 1 is the same as that of the first embodiment.

Figure 14:
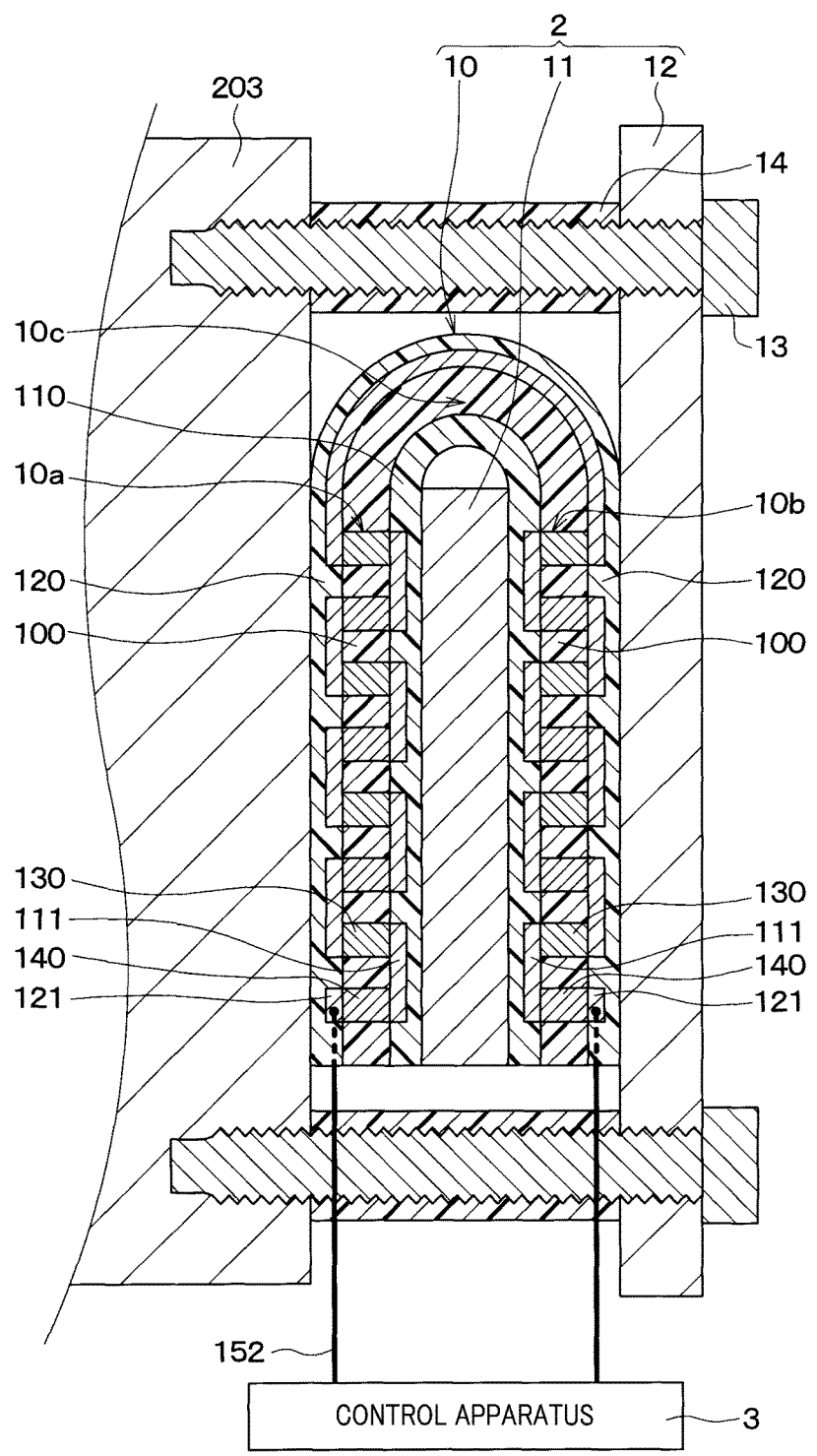
FIG. 14 is a cross-sectional view of a sensor unit in a fourth embodiment.

As shown in FIG. 14, in a sensor unit 2 of the present embodiment, first and second heat flux sensors 10*a* and 10*b* are connected via a bent portion 10*c* having a bent shape. The bent portion 10*c*, like the first and second heat flux sensors 10*a* and 10*b*, has a structure in which an insulating substrate 100, a front surface protecting member 110, and a rear surface protecting member 120 are laminated. As described above, in the sensor unit 2 of the present embodiment, the first and second heat flux sensors 10*a* and 10*b* are integrated.

In other words, the sensor unit 2 of the present embodiment has a structure in which one heat flux sensor 10 is bent so as to sandwich a thermal buffer 11. In the heat flux sensor 10, as described above, each of the insulating substrate 100, the front surface protecting member 110, and the rear surface protecting member 120 is composed of a flexible resin material. Hence, the heat flux sensor 10 can be bent easily. Thus, the configuration having the thermal buffer 11 arranged between the first heat flux sensor 10*a* and the second heat flux sensor 10*b* is realized.

In the first and second heat flux sensors 10*a* and 10*b*, respective rear surface conductor patterns 121 are connected with each other. The first and second heat flux sensors 10*a* and 10*b* are electrically connected not by an external wiring 151 but by a wiring pattern inside the heat flux sensor 10. Note that, the respective front surface conductor patterns 111 may be connected with each other in the first and second heat flux sensors 10*a* and 10*b*.

Thus, the first and second heat flux sensors 10*a* and 10*b* are configured with one heat flux sensor 10, and the external wiring 151 for connecting the first heat flux sensor 10*a* and the second heat flux sensor 10*b* can be eliminated. Therefore, the number of components can be reduced.

Other Embodiments

The present disclosure is not limited to the above embodiments but, as described below, can be correctly modified within the range specified by the claims.

(1) The diagnosis apparatus 1 of the first embodiment sets an assembly state of the bearing 202 as a diagnostic target. The diagnosis apparatus 1 of the second embodiment sets an assembly state of the two rails 305 as a diagnostic target. The diagnostic target of the diagnosis apparatus 1 is not limited thereto. The diagnosis apparatus 1 can set an assembly state of another assembled component as a diagnostic target. However, in another assembled component, the magnitude of the heat flux from the sliding portion must be different between when the assembly state is correct and when it is incorrect.

(2) In the sensor unit 2 of the first to third embodiments, the first and second heat flux sensors 10a and 10b are, electrically connected to the control apparatus 3 in a state of being connected with each other in series, but may be connected in parallel to the control apparatus 3.

(3) In the sensor unit 2 of the first to third embodiments, the first and second heat flux sensors 10a and 10b are arranged so as to output the first and second sensor signals having a relation of opposite polarities, but the arrangement of the first and second heat flux sensors 10a and 10b is not limited thereto. The first and second heat flux sensors 10a and 10b may be arranged so as to output the first and second sensor signals having the same polarity. In this case, the first and second heat flux sensors 10a and 10b are connected in parallel to the control apparatus 3. Further, in the diagnostic control, the control apparatus 3 calculates a difference between the first and second sensor signals. Thereby, like the first and second embodiments, the diagnostic control can be performed.

(4) In the sensor unit 2 of the first to third embodiments, each of the insulating substrate 100, the front surface protecting member 110, and the rear surface protecting member 120 of the heat flux sensor 10 may be composed of a flexible insulating material other than the resin material. Further, each of the insulating substrate 100, the front surface protecting member 110, and the rear surface protecting member 120 may be composed of an insulating material having no flexibility. Additionally, the heat flux sensor 10 may have a structure without the front surface protecting member 110 and the rear surface protecting member 120. In addition, a configuration different from the above configuration may be used as the heat flux sensor 10.

(5) In the sensor unit 2 of the fourth embodiment, each of the insulating substrate 100, the front surface protecting member 110, and the rear surface protecting member 120 of the heat flux sensor 10 may be composed of a flexible insulating material other than the resin material. Further, the heat flux sensor 10 may have a structure without the front surface protecting member 110 and the rear surface protecting member 120. In this case, the first and second heat flux sensors 10a and 10b have a structure in which they are connected via the bent portion 10c configured with the insulating substrate 100. In conclusion, the bent portion 10c may be constituted by including the same insulating material as that of the insulating substrate 100.

(6) The sensor unit 2 of each of the above embodiments includes the two heat flux sensors 10, the thermal buffer 11, and the heat sink 12, but may not need to include the heat sink 12. In this case, the sensor unit 2 is fixed by using another fixing member, an additive agent, or the like.

(7) In each of the above embodiments, voltage is used as the sensor signal of the sensor unit 2, but electric current may be used.

(8) The above embodiments are not unrelated to each other, and correct combinations thereof are possible excluding a case where the combination thereof is obviously impossible. In each of the above embodiments, it goes without saying that an element constituting the embodiment is not always indispensable excluding a case of clearly indicating that it is particularly indispensable, a case where it may be obviously indispensable in principle, and other cases.

SUMMARY

According to a first aspect shown in a part or whole of the above embodiments, the diagnosis apparatus of an assembly state includes a sensor unit and a determination unit. The sensor unit detects a heat flux flowing from a sliding portion toward an outside. The determination unit determines whether the assembly state of assembled components is correct or not based on a detection result detected by the sensor unit.

Further, according to a second aspect, the sensor unit has a first heat flux sensor, a second heat flux sensor, and a thermal buffer arranged between the first heat flux sensor and the second heat flux sensor. The first heat flux sensor outputs a first sensor signal corresponding to the heat flux passing through the first heat flux sensor. The second heat flux sensor outputs a second sensor signal corresponding to the heat flux passing through the second heat flux sensor. The determination unit determines whether abnormality of a target device exists or not based on the first sensor signal and the second sensor signal.

According to the second aspect, the sensor unit has the thermal buffer arranged between the first heat flux sensor and the second heat flux sensor. Hence, when the heat flux emitted from the sliding portion has varied, the heat flux passing through the second heat flux sensor slowly varies later than the heat flux passing through the first heat flux sensor. Therefore, it is possible to detect the variation of the heat flux emitted from the sliding portion from the difference between the first sensor signal and the second sensor signal.

The first heat flux sensor and the second heat flux sensor are arranged on both sides of the thermal buffer, respectively, and both sensors are arranged at positions relatively close to each other. In addition, an ambient temperature that is a temperature of a circumstance where the sensor unit is installed generally varies slowly for a long period of time. Hence, the influences that the first heat flux sensor and the second heat flux sensor respectively receive from the ambient temperature are the same or almost the same. Each of the first heat flux sensor and the second heat flux sensor outputs a sensor signal corresponding to the same or almost the same influence of the ambient temperature. Therefore, using the both sensor signals makes it possible to exclude or reduce the influence of the ambient temperature on the detection result of the sensor unit. Thus, according to the diagnosis apparatus of the second aspect, it is possible to accurately diagnose an assembly state of assembled components.

Further, according to a third aspect, the sensor unit is arranged on a side farther from the assembled components than the second heat flux sensor and has a heat sink having a predetermined heat capacity.

Thus, even in a case where the surface temperature of the sensor unit varies in a short period of time, the temperature variation of the second heat flux sensor can be suppressed from occurring by heat storage and heat radiation in the heat sink. Hence, the detection accuracy of the heat flux of the sensor unit can be improved.

Further, according to a fourth aspect, the heat capacity of the heat sink is made larger than that of the thermal buffer. Thus, even when a large amount of heat is emitted from the sliding portion, the heat can be flown from the sliding portion toward the heat sink. Hence, heat can be prevented from being accumulated inside the sensor unit.

Further, according to a fifth aspect, the sensor unit has a heat receiver that is arranged on a side closer to the assembled components than the first heat flux sensor is. The heat capacity of the heat receiver is made smaller than that of the thermal buffer.

Thus, it is possible by heat storage and heat radiation of the heat receiver to prevent the variation of the heat flux generated in a short period of time, such as a noise, which is not a detection target, from affecting the first and second heat flux sensors. In addition, the variation of the heat flux emitted from the sliding portion, which is a detection target, can be detected by the sensor unit by setting the heat capacity of the heat receiver small.

Further, according to a sixth aspect, the sensor unit has the first and second heat flux sensors arranged therein so that when the heat flux from the sliding portion has sequentially passed through the first and second heat flux sensors, the polarities of the first and second sensor signals are opposite to each other. The first and second heat flux sensors are electrically connected in series.

Thus, the sensor unit can output a sensor signal obtained by adding the first sensor signal and the second sensor signal. Hence, the necessity of arithmetic processing of a sum of the first sensor signal and the second sensor signal can be eliminated.

Further, according to a seventh aspect, each of the first and second heat flux sensors is constituted by including a flexible insulating substrate in a film state, a plurality of first thermoelectric members, and a plurality of second thermoelectric members. In the plurality of first thermoelectric members and the plurality of second thermoelectric members, the first thermoelectric members and the second thermoelectric members are alternately connected in series. The first and second heat flux sensors are connected via a bent portion constituted by including an insulating material.

Thus, the necessity of an external wiring for connecting the first and second heat flux sensors can be eliminated.

What is claimed is:

1. A diagnosis apparatus of an assembly state that diagnoses an assembly state of an assembled component having a sliding portion, the diagnosis apparatus comprising:
    a sensor unit configured to detect a heat flux flowing from the sliding portion toward an outside; and
    a determination unit configured to determine whether an assembly state of the assembled component is correct or not based on a detection result detected by the sensor unit, wherein
    the sensor unit includes:
    a first heat flux sensor;
    a second heat flux sensor arranged on a side farther from the assembled component than the first heat flux sensor is; and
    a thermal buffer having a predetermined heat capacity and arranged between the first heat flux sensor and the second heat flux sensor, wherein
    the first heat flux sensor outputs a first sensor signal corresponding to a heat flux that passes through the first heat flux sensor from the assembled component side toward the thermal buffer side,
    the second heat flux sensor outputs a second sensor signal corresponding to a heat flux that passes through the second heat flux sensor from the thermal buffer side toward an opposite side of the thermal buffer side, and
    the determination unit determines whether the assembly state of the assembled component is correct or not based on the first sensor signal and the second sensor signal.

2. The diagnosis apparatus of an assembly state according to claim 1, wherein
    the sensor unit has a heat sink having a predetermined heat capacity and arranged on a side farther from the assembled component than the second heat flux sensor.

3. The diagnosis apparatus of an assembly state according to claim 2, wherein
    the heat capacity of the heat sink is larger than the heat capacity of the thermal buffer.

4. The diagnosis apparatus of an assembly state according to claim 1, wherein
    the sensor unit has a heat receiver arranged on a side closer to the assembled component than the first heat flux sensor, and
    the heat capacity of the heat receiver is smaller than the heat capacity of the thermal buffer.

5. The diagnosis apparatus of an assembly state according to claim 1, wherein
    the sensor unit has the first heat flux sensor and the second heat flux sensor arranged therein so that when a heat flux from the sliding portion has sequentially passed through the first heat flux sensor and the second heat flux sensor, polarities of the first sensor signal and the second sensor signal are opposite to each other, and
    the first heat flux sensor and the second heat flux sensor are electrically connected in series.

6. The diagnosis apparatus of an assembly state according to claim 5, wherein
    each of the first heat flux sensor and the second heat flux sensor includes:
    a flexible insulating substrate in a film state composed of at least an insulating material,
    a plurality of first thermoelectric members each formed on the insulating substrate and composed of a thermoelectric material, and
    a plurality of second thermoelectric members each formed on the insulating substrate and composed of a thermoelectric material different from that of the first thermoelectric members; wherein
    in the plurality of first thermoelectric members and the plurality of second thermoelectric members, the first thermoelectric members and the second thermoelectric members are alternately connected in series; and
    the first heat flux sensor and the second heat flux sensor are connected via a bent portion which includes the insulating material.

* * * * *